United States Patent Office 3,726,871
Patented Apr. 10, 1973

3,726,871
PROCESS FOR THE PREPARATION OF TRIS-(2-HYDROXYETHYL) ISOCYANURATE
Stephen E. Belsky, Parsippany, and John H. Bonfield, Basking Ridge, N.J., assignors to Allied Chemical Corporation, New York, N.Y.
No Drawing. Continuation-in-part of abandoned application Ser. No. 39,855, May 20, 1970. This application Mar. 22, 1971, Ser. No. 126,884
Int. Cl. C07d 55/38
U.S. Cl. 260—248 NS
29 Claims

ABSTRACT OF THE DISCLOSURE

Improved process for preparing tris(2-hydroxyethyl)-isocyanurate from cyanuric acid and ethylene oxide whereby a ketone is employed as the solvent medium. High yields of pure product are obtained.

---

This application is a continuation-in-part of our copending application Ser. No. 39,855, filed May 20, 1970, now abandoned.

This invention relates to an improved process for preparing tris(2-hydroxyethyl)isocyanurate. More particularly, this invention relates to an improved process for preparing tris(2-hydroxyethyl)isocyanurate using a ketone as the reaction medium.

BACKGROUND OF THE INVENTION

Tris(2-hydroxyethyl)isocyanurate is a commercially available compound of the formula

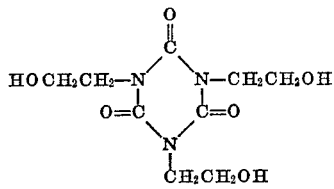

useful in the preparation of temperature resistant coating resins, particularly in enamels for magnetic wire coatings.

DISCUSSION OF THE PRIOR ART

Tris(2-hydroxyethyl)isocyanurate is generally prepared by the reaction of cyanuric acid with ethylene oxide in the presence of solvents such as dimethylformamide, dimethylsulfoxide, N-methyl morpholine and N-methyl oxazolidone-2, and preferably a catalyst. U.S. Pat. 3,088,-948 discloses such a process by reaction at temperatures of from 25–140° C. in the presence of an alkali metal catalyst and an inert solvent such as dimethylformamide. The rate of reaction and the yield of tris(2-hydroxyethyl)isocyanurate are good. However, this process has the disadvantage that the solvent is very expensive. Since losses of the solvent occur during handling and recovery as by flash distillation and this solvent has a high boiling point, the use of this solvent adds materially to the overall costs of this process.

Various alternatives to the use of dimethylformamide have been suggested. For example, Belgian Pat. 24,840 discloses that the reaction can take place in lower alcohols and water soluble ethers. However, this process has the disadvantage that lengthy reaction times, on the order of 10–20 hours, are required for satisfactory yields of the desired product.

SUMMARY OF THE INVENTION

It is an object of the present invention to provide an improved process for preparing tris(2-hydroxyethyl) isocyanurate which avoids the use of expensive solvents.

It is another object to provide a process whereby tris(2-hydroxyethyl)isocyanurate is prepared rapidly and in high yield.

Further objects will become apparent from the following detailed description thereof.

The present process utilizes a lower ketone as the solvent medium for the reaction of cyanuric acid with ethylene oxide. Suitable ketones include ketones of up to 6 carbon atoms, such as acetone, methyl ethyl ketone, n-propyl ketone, diethyl ketone and cyclohexanone. Acetone, methyl ethyl ketone, and cyclohexanone are commercially available and are preferred. Acetone is particularly preferred due to its lower cost.

The ketones are low boiling solvents which promote the formation of tris(2-hydroxyethyl)isocyanurate in a rapid and simple manner. The reaction occurs with a minimum of side reactions and the product is obtained in pure form, obviating the need for further purification of the product.

According to the present process, cyanuric acid and ethylene oxide are reacted in the presence of a ketone as described above at a temperature of from about 70–170° C. optionally in the presence of a catalyst.

Another feature of the present process is the addition of tris(2-hydroxyethyl)isocyanurate at the start of reaction. Unexpectedly, it was found that the presence of a small amount of the product at the beginning of the reaction increases the rate of reaction. Although the reason for this improvement is not known precisely, it is believed that the tris(2-hydroxyethyl)isocyanurate solubilizes the cyanuric acid, thus improving contact between the cyanuric acid and ethylene oxide.

DETAILED DESCRIPTION OF THE INVENTION

According to the present process, at least three mols of ethylene oxide are reacted for each mol of cyanuric acid in a ketone solvent at 70–170° C. When reaction is complete, the product is separated from the liquid reaction medium. Generally, a slight excess of ethylene oxide, from about 3.1 to 3.5 mols per mol of cyanuric acid is employed.

The reaction can be carried out at temperatures from about 70–170° C. The preferred range is 100–160° C. and particularly good rates of reaction are obtained between 100–140° C. The reaction can be conducted at pressures of from about atmospheric (14.7 p.s.i.) up to about 50 atmospheres (735 p.s.i.) depending on the vapor pressure of the solvent at reaction temperature. Preferably, the pressure is sufficient to liquify the ethylene oxide at the temperature of reaction, thereby bringing it into solution and improving the rate of reaction, generally 2–20 atmospheres. The reaction can be pressurized by addition of an inert gas, such as nitrogen. However, lower pressures can be employed for a solvent having comparatively lower vapor pressures, such as cyclohexanone. The latter solvent has the additional advantage that solvent losses due to evaporation are lower than for the lower boiling solvents such as acetone.

The ketone solvent is employed in an amount sufficient to form a workable slurry of cyanuric acid at the start of reaction, and to dissolve the product at the reaction temperature. Generally, amounts of from about 25–1000% by weight of solvent based on the cyanuric acid can be employed. However, large excesses of solvent should be avoided, since the reactants are diluted thereby, decreasing the reaction rate and purity of the product and increasing handling costs. A further advantage is that improved reaction rates are obtained in low solvent concentrations at lower temperatures than when a larger amount of solvent is added, thereby increasing the overall yields. Thus amounts of from 25 to 400% by weight of solvent based on the cyanuric acid are preferred, most preferably 75–100% by weight.

The reaction can be carried out in the presence or absence of a catalyst, which will increase the rate of reaction. Suitable catalysts include both acids and bases. Illustrative of acid catalysts are sulfuric acid, sulfonic acids, alkali metal bisulfates, hydrogen chloride, hydrogen bromide, lithium chloride, phosphoric acid, boron trifluoride, phosphorus trichloride, benzyl chloride, phthaloyl chloride and the like. Suitable basic catalysts include the alkali metal and alkaline earth metal hydroxides and carbonates; tretiary aliphatic amines such as triethylamine, tripropylamine, and the like. Salts such as sodium cyanurate substituted ammonium halides such as tetramethyl ammonium chloride, benzyltrimethyl ammonium chloride, tetraethyl ammonium chloride and the like can also be employed. The catalyst is generally employed in amounts of from about 0.5 to 5 percent by weight of the cyanuric acid. The catalyst can be added conveniently as an aqueous solution, or a small amount of water can be added to the starting mixture to dissolve the catalyst.

The addition of tris(2-hydroxyethyl)isocyanurate to the reactants increases the rate of reaction. Up to about 500% by weight of the cyanuric acid of tris(2-hydroxyethyl)isocyanurate can be added, but preferably amounts of from about 10–100% by weight of the cyanuric acid are employed.

When reaction is complete, generally indicated by the disappearance of a solid phase, the product is separated from the reaction mixture by cooling to precipitate the product and collecting the product. When a solid, insoluble catalyst is employed, it is first removed, as by filtration, prior to cooling. The product is separated from the reaction mixture in conventional manner, as by filtration or centrifugation. When very low proportions of ketone solvent are present, additional amounts of solvent can be added to form a slurry suitable for centrifugation. The tris(2-hydroxyethyl)isocyanurate is obtained in pure form and can be utilized directly for the preparation of coating resins. However, the product can be further purified if desired, as by recrystallization from a suitable solvent.

In a preferred step, the mother liquor reserved after collecting the product, which contains the solvent and dissolvent tris(2-hydroxyethyl)isocyanurate, is recycled for use with a subsequent batch of cyanuric acid for a subsequent reaction step, thereby increasing the rate of reaction and overall yield of tris(2-hydroxyethyl)isocyanurate. The catalyst, if employed, can also be recycled.

Thus the present invention provides a simple, inexpensive, rapid process for the preparation of tris(2-hydroxyethyl)isocyanurate of high purity in high yield, which avoids the use of expensive solvents.

The invention will be further illustrated by the following examples, but it is to be understood that the invention is not meant to be limited to the details described therein. In the examples all parts and percentages are by weight unless otherwise noted.

EXAMPLE 1

A suspension of 130 parts of cyanuric acid, 392 parts of acetone, 8 parts of water and 1 part of lithium chloride was charged to a pressure reactor and heated to 150° C. 140 parts of ethylene oxide were added and the pressure increased to 250 p.s.i. with nitrogen. Reaction was continued for about 5 hours and the resultant solution cooled to room temperature. The product precipitated and was isolated by centrifuge. 192 parts of product were obtained which was recrystallized from isopropanol and dried at 80° C. under vacuum.

184.5 parts (74% yield) of tris(2-hydroxyethyl)isocyanurate were obtained having a melting point of 134.7° C.

EXAMPLE 2

A suspension of 130 parts of cyanuric acid, 392 parts of acetone, 8 parts of water, 1 part of lithium chloride and 12.5 parts of tris(2-hydroxyethyl)isocyanurate was reacted with 140 parts of ethylene oxide following the procedure of Example 1. After three hours, the reaction was discontinued and the product cooled overnight while stirring. The solids were centrifuged and dried for 3 hours at 75° C.

226 parts (82% yield) of tris(2-hydroxyethyl)isocyanurate were obtained having a melting point of 131.6–133° C.

EXAMPLE 3

A suspension of 130 parts of cyanuric acid, 392 parts of acetone and 12.5 parts of tris(2-hydroxyethyl)isocyanurate was reacted with 140 parts of ethylene oxide following the procedure of Example 1. After 14 hours, reaction was discontinued and the product recovered.

A 66% yield of tris(2-hydroxyethyl)isocyanurate was obtained on recovery as in Example 2.

EXAMPLE 4

The procedure of Example 2 was followed except using 592 parts of acetone and 25 parts of tris(2-hydroxyethyl)isocyanurate and discontinuing the reaction after 3 hours.

216 parts of product were obtained having a melting point of 130.5° C.

EXAMPLE 5

The procedure of Example 2 was followed except using 1 part of sodium hydroxide as catalyst and replacing 200 parts of the acetone with the mother liquor of Example 4.

Reaction was complete in 2 hours. 224 parts of product were obtained having a melting point of 134.1° C.

EXAMPLE 6

The procedure of Example 5 was followed except using 200 parts of the mother liquor of Example 5 and omitting the addition of tris(2-hydroxyethyl)isocyanurate.

Reaction was complete after 2.5 hours and 222 parts of product were obtained having a melting point of 133.8° C.

This corresponds to a yield of 80% based on cyanuric acid reacted. Since additional product present in the mother liquor employed as solvent was also recovered, the total effective yield was 92%.

EXAMPLE 7

A suspension of 130 parts of cyanuric acid, 25 parts of tris(2-hydroxyethyl)isocyanurate, 392 parts of acetone, and 2 parts of 60% aqueous solution of benzyltrimethylammonium chloride was charged to the reaction of Example 1 and heated to 120° C. 140 parts of ethylene oxide were added, the pressure increased to 250 p.s.i. with nitrogen and reaction continued at 120–125° C. for 3 hours. 400 parts of acetone were stirred in, the solution cooled to 25° C., and the precipitated product isolated by centrifuge.

225 parts (76.5% yield) of tris(2-hydroxyethyl)isocyanurate were obtained having a melting point of 133.8° C.

EXAMPLE 8

The procedure of Example 7 was followed except using 200 parts of acetone in the reaction. Reaction was complete in 1¾ hours. 100 parts of acetone were employed to wash the product.

242 parts (83.2% yield) of tris(2-hydroxyethyl)isocyanurate were obtained having a melting point of 134.6° C.

EXAMPLE 9

The procedure of Example 8 was followed except using 162.5 parts of cyanuric acid, 31.5 parts of tris(2-hydroxyethyl)isocyanurate, 125 parts of acetone, 2.5 parts of 60% aqueous solution of benzyltrimethylammonium chloride and 175 parts of ethylene oxide. Reaction was complete in one hour.

319 parts (87.5% yield) of tris(2-hydroxyethyl)isocyanurate were obtained having a melting point of 135.2° C.

EXAMPLE 10

The procedure of Example 7 was followed except using as catalyst a solution of 1.2 parts of lithium chloride in 8 parts of water. Reaction was complete in 5 hours. 50 parts of acetone were employed to wash the product.

233 parts (82.2% yield) of tris(2-hydroxyethyl)isocyanurate were obtained having a melting point of 133.4° C.

EXAMPLE 11

The procedure of Example 10 was followed using 162.5 parts of cyanuric acid, 31.5 parts of tris(2-hydroxyethyl)isocyanurate, 1.5 parts of lithium chloride, 10 parts of water, 125 parts of acetone and 175 parts of ethylene oxide. After 2.5 hours reaction was complete, the solution cooled, 62.5 parts of acetone added and the product recovered by centrifugation. 62.5 parts of acetone were employed to wash the product.

311.5 parts (85% yield) of tris(2-hydroxyethyl)isocyanurate were obtained having a melting point of 132.4° C.

EXAMPLE 12

A suspension of 162.5 parts of cyanuric acid, 31.5 parts of tris(2-hydroxyethyl)isocyanurate, 125 parts of cyclohexanone and 5 parts of a 60% aqueous solution of benzyltrimethylammonium chloride were charged to a pressure reactor and heated to 120–125° C. 175 parts of ethylene oxide were added over two hours incrementally so as to maintain the pressure at about 50 p.s.i. The solution was then cooled, and an additional 62.5 parts of cyclohexanone added. The product was centrifuged, washed with an additional 62.5 part portion of cyclohexanone and dried for one hour at 130° C.

320 parts (87.7% yield) of tris(2-hydroxyethyl)isocyanurate were obtained having a melting point of 134.2° C.

We claim:

1. In the process for preparing tris(2-hydroxyethyl)isocyanurate by reacting cyanuric acid with ethylene oxide in the presence of a catalyst and solvent at a temperature of from 70° to 170° C. and a pressure of from about 1 to about 50 atmospheres whereby a reaction mixture is obtained from which said tris(2-hydroxyethyl)isocyanurate is recovered as product, the improvement which comprises effecting said reaction in the presence of tris(2-hydroxyethyl)isocyanurate while employing a lower ketone as solvent therefor.

2. A process according to claim 1 wherein from 25 to 1000% by weight of the lower ketone is present based on the weight of cyanuric acid.

3. A process according to claim 1 wherein the ketone has up to six carbon atoms.

4. A process according to claim 3 wherein the ketone is acetone.

5. A process according to claim 3 wherein the ketone is cyclohexanone.

6. A process according to claim 1 wherein the catalyst is an acid catalyst.

7. A process according to claim 6 wherein the catalyst is lithium chloride.

8. A process according to claim 1 wherein the catalyst is a basic catalyst.

9. A process according to claim 8 wherein the catalyst is an alkali metal hydroxide.

10. A process according to claim 1 wherein the catalyst is a hydrocarbon-substituted ammonium halide.

11. A process according to claim 10 wherein the catalyst is benzyltrimethylammonium chloride.

12. A process according to claim 1 wherein up to about 500% by weight of tris(2-hydroxyethyl)isocyanurate is present, based on the weight of the cyanuric acid.

13. A process according to claim 1 wherein from 75–100% by weight of the ketone is present based on the weight of cyanuric acid.

14. A process according to claim 1 wherein the temperature is 100–140° C.

15. A process according to claim 14 wherein from about 10 to about 100% by weight of tris(2-hydroxyethyl)isocyanurate is present, based on the weight of the cyanuric acid.

16. A process according to claim 15 wherein the cyanuric acid is reacted with from about 3.1 to 3.5 mols of ethylene oxide per mol of cyanuric acid.

17. A process according to claim 16 wherein, upon completion of the reaction, the tris(2-hydroxyethyl)isocyanurate product is recovered by cooling of the reaction mixture and separation therefrom as a precipitate.

18. A process according to claim 17 wherein the ketone is acetone.

19. A process according to claim 17 wherein the ketone is cyclohexanone.

20. A process according to claim 17 wherein tris(2-hydroxyethyl)isocyanurate is present at the start of reaction.

21. A process according to claim 17 wherein the mother liquor is reserved after separation of the product and recycled to a subsequent batch of cyanuric acid.

22. A process for preparing tris(2-hydroxyethyl)isocyanurate which comprises reacting cyanuric acid with from about 3.1 to 3.5 mols of ethylene oxide per mol of cyanuric acid in the presence of from 25 to 400% by weight of acetone based on the weight of cyanuric acid, containing dissolved therein from about 10 to 100% by weight of the cyanuric acid of tris(2-hydroxyethyl)isocyanurate, and in the presence of a catalyst at a temperature of from 100 to 160° C. under a pressure of 2 to 20 atmospheres and separating the product from the reaction mixture.

23. A process according to claim 22 wherein, upon completion of the reaction, the tris(2-hydroxyethyl)isocyanurate product is recovered by cooling of the reaction mixture and separation therefrom as a precipitate.

24. A process according to claim 23 wherein the catalyst is a hydrocarbon-substituted ammonium halide.

25. A process according to claim 24 wherein said halide is benzyltrimethylammonium chloride.

26. A process for preparing tris(2-hydroxyethyl)isocyanurate which comprises reacting cyanuric acid with from about 3.1 to 3.5 mols of ethylene oxide per mol of cyanuric acid in the presence of from 75 to 100% by weight of cyclohexanone based on the weight of cyanuric acid, containing dissolved therein from about 10 to 100% by weight of the cyanuric acid of tris(2-hydroxyethyl)isocyanurate and in the presence of a catalyst, at a temperature of from 100 to 140° C. under pressure of from 1 to 20 atmospheres and separating the product from the reaction mixture.

27. A process according to claim 26 wherein, upon completion of the reaction, the tris(2-hydroxyethyl)isocyanurate product is recovered by cooling of the reaction mixture and separation therefrom as a precipitate.

28. A process according to claim 27 wherein said catalyst is a hydrocarbon-substituted ammonium chloride.

29. A process according to claim 28 wherein said halide is benzyltrimethylammonium chloride.

References Cited

UNITED STATES PATENTS

| | | | |
|---|---|---|---|
| 3,088,948 | 5/1963 | Little et al. | 260—248 |
| 3,313,812 | 4/1967 | Churchill et al. | 260—248 |
| 3,265,694 | 8/1966 | Walles et al. | 260—248 |
| 3,259,626 | 7/1966 | Muller et al. | 260—248 |

JOHN M. FORD, Primary Examiner